INVENTORS.
William H. Payne
Francis R. Proper.
BY
Hovey & Hamilton,
ATTORNEYS.

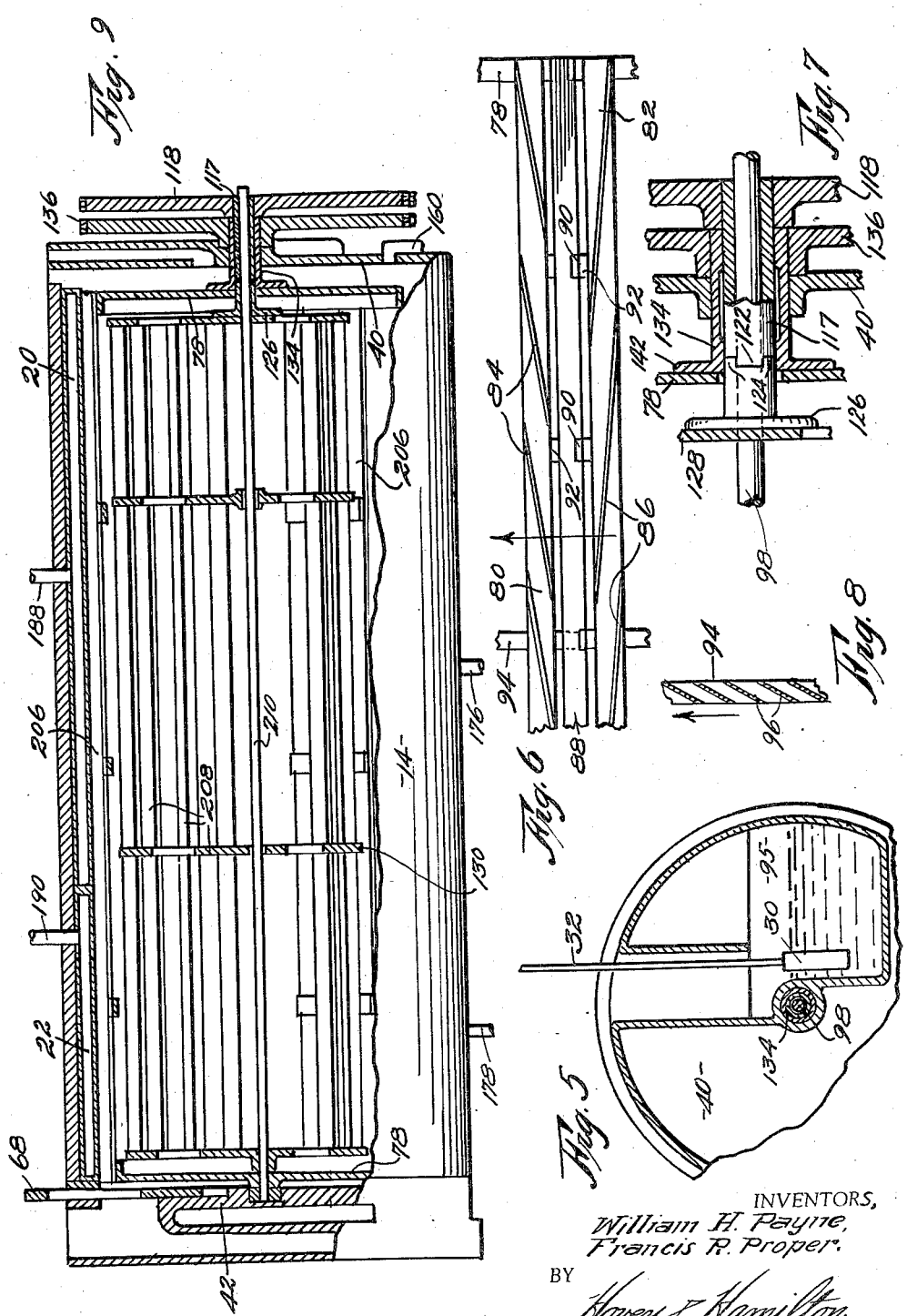

Patented Nov. 3, 1936

2,059,485

UNITED STATES PATENT OFFICE 2,059,485

ICE CREAM MACHINE

William H. Payne and Francis R. Proper, Kansas City, Mo.

Application March 12, 1934, Serial No. 715,177

8 Claims. (Cl. 259—10)

This invention relates to ice cream freezers and particularly to a freezer adapted for continuous or batch freezing.

In the manufacture of ice cream it has been found that the proper control of the temperatures and whipping of the materials is very essential in the economical production of a uniform and close texture ice cream, into which has been incorporated a sufficient quantity of finely divided air cells to produce the desired overrun. While in some of the present machines it has been attempted to attain the above results, yet due to the lack of proper control of the temperatures and whipping during the whipping and finishing operations the results have been unsatisfactory. In the present continuous freezers the mix is simultaneously frozen and aerated in a single compartment and delivered to the outlet in a frozen state. It is apparent that the freezing requires a much longer period when so produced, thereby causing a coarser grain than when more rapidly frozen. When using the ordinary batch freezer it has been found that the texture of the product is very coarse due to slow freezing and the conditions of the mix required in the operation of this type of freezer.

The present invention contemplates the overcoming of the above difficulties by having full control of the mix to be frozen from the time it enters the machine till it is delivered a finished product therefrom. This is accomplished by the use of novel means to determine the position, agitation, air incorporation and temperatures of the mix during its different stages of preparation.

In this freezer it is desired to freeze mostly the water as soon as possible, as a quickly formed ice crystal is small, and if a large amount of ice is formed in the freezer, less will be needed to be formed in the hard room, as that formed in the hard room goes to make an ice cream of a poor texture.

During the first minute or so of freezing the mix loses its sensible heat and as soon as it reaches the freezing point which is near 27.5° F., the extraction of the latent heat of fusion takes place. At this period of freezing the first water crystals are formed causing an increase in concentration of the unfrozen liquid, for the reason that freezing is a purification process, and only the water freezes into crystals. After this takes place, then the temperature of the mix must be lowered again to the freezing point of the unfrozen liquid before more water crystals can be formed. This accounts for the slow reduction of temperature after the freezing point has been reached.

Ice cream contains a high percentage of solutes and it is no simple matter to remove the latent heat of fusion. Mixes vary and are of different composition and are frozen under different conditions, therefore under varying conditions it is not always a good policy to shut off entirely the refrigerant when the freezing temperature of the mix has been reached, as all of the latent heat of fusion has not been removed during the freezing process. Again under different circumstances and varying conditions it may be best to choke or shut off refrigerant at freezing point.

As stated before, it is essential to freeze a certain amount of water in the freezer. If it is not and the refrigerant is shut off too soon, the mix will be soft and will result in the ice cream being coarse after hardening.

The overrun or yield increases during the period or time the ice cream mix is in the freezer, whether the mix is giving up sensible or latent heat until a maximum increase in product is obtained, after which time the overrun will fall. This is the last stage of the freezing process and is very important in that the proper amount of air incorporation, the whipping and the finishing process of the product in order to permit the desired overrun or yield.

It is very essential to have full control over this last period of freezing in that many times the mix has a tendency to raise in temperature toward the end of the freezing and finishing period, and especially if the overrun is obtained with difficulty.

The principal object of the present invention is the provision of an ice cream freezer wherein the material is first treated in a freezing compartment and then passed to a finishing compartment where it is treated by a whipping action and the introduction of air.

Another object of this invention is the provision of a freezer having two compartments, each compartment having means for agitating the material being frozen and means operable to vary the relative speeds of the agitators in said compartments.

A further object of the invention is the provision of a freezer wherein the operator has full control over the variable temperatures and whipping operation during the freezing and finishing operations.

Other objects of this invention are ease, economy and efficiency of operation, adaptability to meet the varying conditions required in handling different materials to be frozen and means for mixing fruits, nuts, etc., with the cream just prior to its ejection from the machine.

With these purposes in mind, together with other objects which will appear during the course of the specification, reference will now be had to the drawings wherein:

Fig. 5 is a fragmentary sectional view taken on line V—V of Fig. 1.

Fig. 6 is a fragmentary view of the scraper.

Fig. 7 is a broken detailed view of certain of the driving parts.

Fig. 8 is a fragmentary sectional view taken on line VIII—VIII of Fig. 1, and,

Fig. 9 is a sectional view of a portion of the modified freezer as constructed when used as a batch machine.

Figure 1:
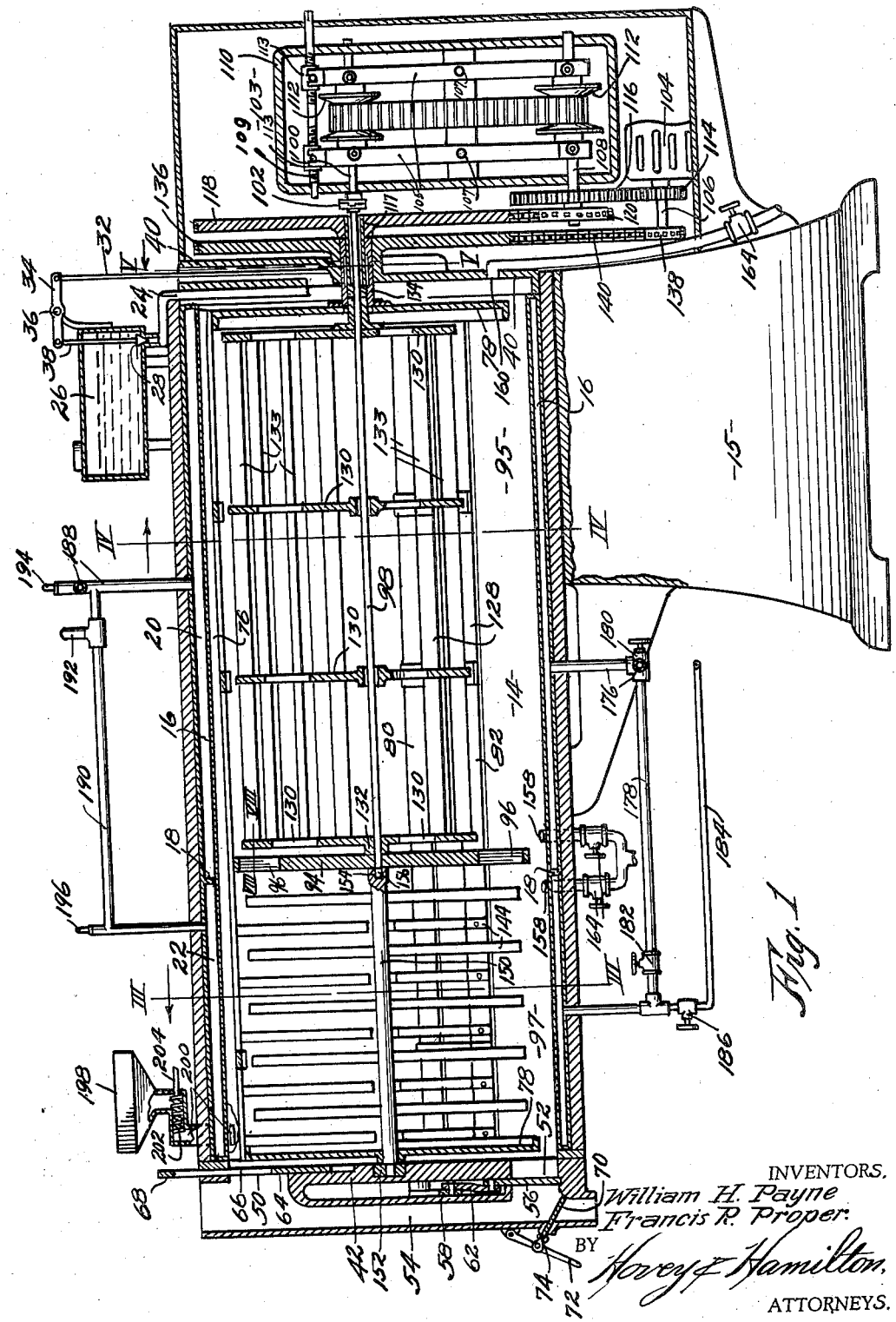
Figure 1 is a longitudinal sectional view of a freezer embodying this invention.

Like reference characters designate similar parts throughout the several views, and the numeral 14 indicates a treating chamber of a horizontally disposed hollow cylindrical form, mounted on a base 15, and of a length suitable to contain certain compartments necessary to carry out the proper freezing and finishing or conditioning of the ice cream as hereinafter described.

Surrounding this chamber is a refrigerant container or jacket 16 which preferably extends the full length of the chamber and is vertically divided by a ring partition 18 to form two separate refrigerant compartments 20 and 22. An inlet for the introduction of materials to be frozen, usually termed mix, consists of a conduit 24 communicating with mix tank 26, which is preferably positioned above 14 to permit the flow of mix by gravity. To properly control the flow of mix to the chamber 14, a valve 28 operated by a liquid level float 30 positioned in chamber 14 and interconnected with valve 28 through the intermediacy of link 32, lever 34 pivoted at 36 and valve stem 38 is provided. By referring to Fig. 5 it will be noted that float 30 is so positioned in 14 as to maintain a liquid level at about the center of the chamber, however, this level might be varied by simply changing the length of link 32. The intake end wall 40 is irregular in form and is adapted to properly house the float 30 in the chamber so as to always be in the zone of the liquid incoming mix and to be free from any of the moving parts.

The discharge end of the chamber 14 is provided with a suitably detachable end member 42. For convenience of operation, the end member is hinged at 44 and provided with securing nuts 46 mounted on stub bolts 48. For reasons hereinafter more definitely set forth an upper outlet opening 50 and a lower outlet port 52 are provided in 42, each communicating with a passageway 54 extending from top to bottom of 42. Port 52 is provided with a closure 56 slidably mounted and adapted to be operated by means of manually controlled lever 58 pivoted at 60 and interconnected to 56 by means of pivoted link 62. The upper outlet opening is controlled by a slidably mounted outlet gate 64 having an opening 66 which normally registers with the outlet 50.

When it is desired to raise the level of the material in the chamber gate 64 is simply raised, thus making it necessary for the material to be raised to a higher level before it can pass from the chamber. For convenience of operation, 64 extends outside of 42 and is provided with a hand hold 68. Passageway 54 has a control gate 70 positioned below outlet port 50 which is operable by means of hand lever 72 to which it is interconnected by means of link 74.

Mounted for rotation in chamber 14 is scraper 76 which is adapted to be driven so as to prevent undue accumulation of material on the inner wall of 14 and to assist in the agitation and the moving of the materials being frozen toward the exit end of the chamber. The scraper has end spiders 78 on which are securely mounted sets of longitudinally disposed forward bars 80 and rear bars 82, which are spaced apart from the inner wall of the chamber. As clearly shown in Fig. 6, bars 80 are provided with a series of blades 84, inclined at an angle to the direction of travel of rotation of the scraper as indicated by the arrow and adapted to move the material toward the outlet of the chamber. The follow-up or rear bar 82 has blades 86 which are inclined at a less angle to the direction of travel than those on 80 and in a direction which would tend to force the material toward the inlet.

Between bars 80 and 82, which are spaced apart, is a longitudinally disposed blade 88 hinged at 90 and adapted to contact the cylinder wall at an angle during the operation of the machine. The centrifugal force due to the rotation of the scraper tends to hold 88 yieldingly against the side wall.

Carried by bars 80 and 82 intermediate their ends are cross bars 92 which facilitate proper hinge support for 88 throughout its intermediate portion. It will be observed upon examination that blades 84 due to their greater angularity will force the material toward the exit at a greater rate than blades 86 will force it toward the intake end, thus causing a good agitation of the material which has a resultant general flow toward the outlet.

Intermediate the ends of the scraper member and carried thereby is a partition 94 which serves to divide the chamber 14 into a freezing compartment 95 and finishing compartment 97. While this partition may not completely separate the two compartments, yet it is of sufficient extent to properly control the material being frozen and finished. Adjacent the outer periphery of 94 is a circular band of spaced apart, inclined blades 96 positioned in substantially lower form. These blades are so directed relative to the direction of rotation of the partition as to cause the material in the freezing compartment to be forced into the finishing compartment. By suitable adjustment of these blades and the regulation of their speed of rotation the feeding of the material from one compartment to the other may be definitely regulated and determined.

Axially mounted for rotation in cylinder 14 is a shaft 98 having its outer end extended through end wall 40 and interconnected with the driving shaft 100 of a suitable variable speed transmission through the intermediacy of a clutch 102, and its inner end journalled in partition 94.

The variable speed transmission 103 is one of several well known types that might be used as a means for controlling the speed of the different moving parts of this device, and consists essentially of a motor 104 having a drive shaft 106, parallel shafts 100 and 108 mounted in frame 110, a two-part grooved V pulley 112 carried by each shaft respectively and splined thereto so that the parts of each may be moved toward and from each other and a V belt operatively engaging said pulleys, whereby the relative speeds of shafts 108 and 100 may be varied to any desired ratio between a given maximum and minimum as provided and shown. The means employed for varying the speed ratio between shafts 108 and 100 also includes arms 105, each of which is pivotally supported at 107 intermediate its ends. These arms are pivotally attached to the proximal parts of pulleys 112 and are movable about pivotal points 107 to carry the parts of the pulleys 112 toward and from each other.

A shaft 109, having right and left hand screw threads formed thereon in screw-threaded engagement with blocks 113, may be turned to move the blocks 113 toward and from each other. These blocks are in connection with one end of arms 105 as illustrated. When blocks 113 are moved together, the parts of upper pulley will also be so moved, but the parts of lower pulley 112 will be moved apart. When blocks 113 are moved apart, the parts of upper pulley 112 will be moved apart, but the parts of lower pulley 112 will be moved together. Shaft 108 is driven by motor 104 through pinion 114 and gear 116, and by the use of the transmission 103, it is evident that the speed of shaft 100 may be varied at will without changing the speed of the motor 104. Rigidly secured to a bearing sleeve 117 which extends through end wall 40 and is rotatably mounted on shaft 98 is sprocket wheel 118 which is in operative alignment with sprocket wheel 120 rigidly carried by shaft 108. Sprocket wheels 118 and 120 are interconnected by the usual sprocket chain.

Referring to Fig. 7, it will be observed that sleeve 117 is provided with clutch teeth 122 which intermesh with teeth 124 formed in a hub member 126 to drive dasher 128 mounted for rotation in compartment 95 and within the scraper member 76. Dasher 128 comprises a series of spokes 130 mounted on hubs 132, and longitudinally spaced apart bars 133 carried by said spokes.

Another sleeve 134 is journalled in end member 40 and serves as a journal for bearing sleeve 117. A sprocket wheel 136 is rigidly affixed to sleeve 134 outside the chamber and is operatively connected to sprocket wheel 138 mounted on shaft 108 by means of sprocket chain 140. The inner end of sleeve 134 has a flange 142 which is secured to 78 to drive the scraper.

Figure 3:
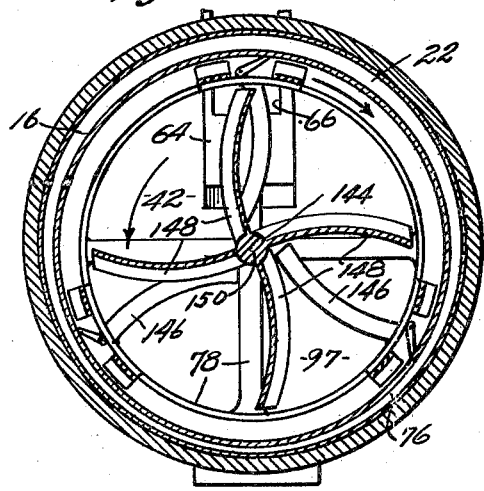
Fig. 3 is a vertical cross sectional view taken on line III—III of Fig. 1.

An agitator 144, comprising a series of arcuate, inwardly projecting, spaced-apart arms 146 carried by scraper 76 and adapted to rotate therewith and a series of outwardly projecting, spaced apart arms 148 carried by an axially aligned shaft 150 mounted for rotation at its outer end in a bearing 152 carried by end member 42 while its other end is provided with a squared socket 154 into which is fitted the squared end 156 of shaft 98, is adapted to be rotated at a relatively high speed. Arms 146 and 148 are positioned in overlapped relation and rotate in opposite directions to whip the materials vigorously, thereby causing a breaking up of the air cells in the ice cream to produce a fine grained product. The particular form of the arms 146 and 148 is clearly shown in Fig. 3.

It will be noted that the scraper 76, dasher 128, and the inner portion of agitator 144 are so mounted and driven that their relative speed may be varied by the operator to properly control the materials being frozen. The ratio of speed of the scraper and motor will be constant because of their direct connection as shown, while the speeds of the dasher and agitator may be varied relative to each other and to the scraper by manipulating toward and from each other the V-pulleys 112 of the variable speed transmission 103.

The introduction and incorporation of air into the ice cream is essential to produce the proper overrun or bulk of the finished product. For this purpose air jets 158, 160 and 162 are provided to introduce air into the lower portion of chamber 18 where it will be properly mixed with the ice cream. Preferably these jets are supplied with compressed air from a reservoir not shown. Control valves 164 are provided to regulate the flow of air into the chamber 14.

It is obvious that any of the various refrigerants might be used in compartments 20 and 22 to effect the required temperature reductions for the ice cream, however to clearly disclose the functioning of these novel compartments 20 and 22, a portion of an ammonia absorption system is shown.

Figure 2:
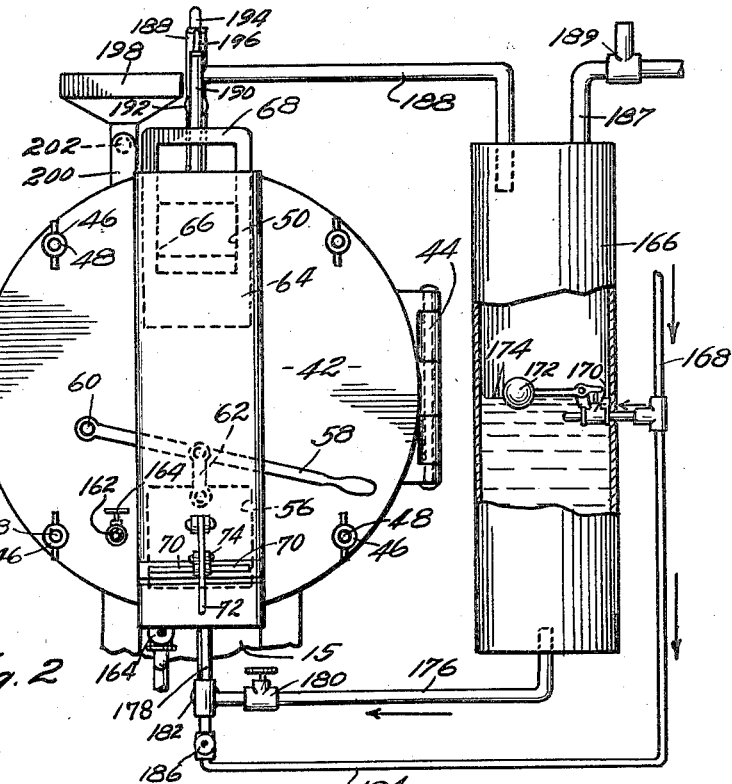
Fig. 2 is an end elevation of the freezer with parts broken away for clearness.

In this installation the vertically disposed ammonia tank 166 is positioned in such a manner that its vertical central portion is substantially in alignment with the horizontal diameter of the chamber 14 as clearly shown in Fig. 2. A high pressure liquid ammonia supply pipe 168 communicates with tank 166 and the flow of ammonia to the tank is controlled by the liquid level control valve 170 having a float 172 operable by the liquid ammonia in such a manner to maintain a substantially constant liquid level 174. Pipe 176 extending from the bottom portion of tank 166 is in communication with compartment 20 at its lower portion, also pipe 178 communicates with pipe 176 and the lower portion of compartment 22. Cutoff valves 180 and 182 positioned in pipes 176 and 178 respectively control the flow of ammonia therethrough.

Figure 4:
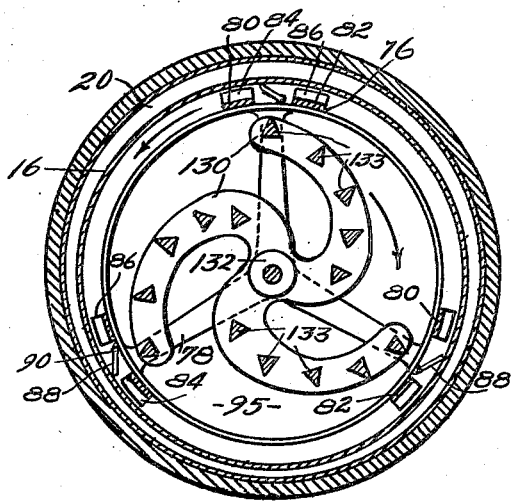
Fig. 4 is a vertical section taken on line IV—IV of Fig. 1.

A continuation of high pressure liquid ammonia pipe 168 also communicates with pipe 178 through pipe 184 having a needle control valve 186. It is apparent that with the pressure properly regulated as hereinafter set forth a liquid level of ammonia in 20 and 22 may be obtained that will correspond to the liquid level in the tank 166, also varying quantities may be fed to 20 and 22 by proper manipulation of the control valves. For the purpose of providing proper proportionate volumes of gas and liquid ammonia in the compartments 20 and 22 the cylindrical shells forming the walls are disposed in eccentric relation so that the radial cross sectional area increases from bottom to top as clearly shown in Figs. 3 and 4. The gas pipe 187 leading from tank 166 is provided with a pressure regulating valve 189 which may be set to determine the pressure under which the system will operate.

To conduct gases from compartment 20 to tank 166 a conduit 188 is provided, while the pipe 190 having a pressure regulating valve 192 connects 188 to compartment 22. Safety valves 194 and 196 are provided for conduit 188 and pipe 190 respectively. Since the compartments 20 and 22 are substantially coextensive with the freezing and finishing compartments respectively and are provided with a controlled supply of refrigerant and with means for controlling the respective back pressures, it is evident that the desired differential of temperatures may be obtained in the two compartments.

A fruit and nut hopper 198 is positioned at the upper side of the chamber 14 and adjacent the discharge opening and communicates with compartment 97 through the conduit 200 in which is mounted a force feed member 202 mounted on shaft 204 which is driven by a motor not shown.

When the fruit or nuts are fed into the cream at this point they will be properly mixed therewith, however, they will not be beaten or ground up into too small pieces to make a good product.

While the above described freezer is primarily suitable for continuous freezing, yet by a few simple changes hereinafter described the freezer is suitable for batch freezing. The changes necessary are the removal of the scraper, dasher and agitator with their co-operating parts, the inserting of the scraper 206 which is similar to scraper 76 and extends the entire length of chamber 14, and likewise the insertion of dasher 208 also extending the full length of 14. Scraper 206 and dasher 208 are driven in like manner as are scraper 76 and dasher 128, however due to the elimination of agitator 144 shaft 98 will not be used and may be disconnected through clutch 102. The scraper 206 and dasher 208 are mounted on the shaft 210 which extends entirely through chamber 14 and is carried by the end members 40 and 42.

By the use of the above described freezer it is apparent that the operator has full control of the mix, temperatures, incorporation of air, and the agitation of the materials throughout the entire production of ice cream both in continuous and batch freezing.

Having thus described the invention, what is claimed as new and desired to be secured by Letters Patent is:

1. A freezer comprising a freezing chamber having an inlet at one end and an outlet at its opposite end; means for cooling said chamber; a scraper mounted for rotation within said chamber; an agitator rotatably mounted in said chamber adjacent the outlet end, a dasher mounted for rotation in said chamber intermediate said agitator and the inlet end of the chamber; and means for simultaneously rotating said scraper, agitator and dasher at relatively different speeds.

2. A freezer comprising a cylindrical freezing chamber having an inlet at one end and an outlet at its opposite end; a refrigerant jacket surrounding said chamber; a scraper mounted for rotation within said chamber; an agitator rotatably mounted in said chamber adjacent the outlet end; a dasher rotatably mounted intermediate said agitator and the inlet end of said chamber; means for rotating said scraper, dasher and agitator at relatively different speeds whereby the speed of rotation of the agitator is varied without changing the speed of rotation of the dasher and scraper.

3. An ice cream freezer comprising an elongated freezer chamber having an inlet at one end and an outlet at its opposite end; a refrigerant jacket surrounding said chamber; a rotatably mounted partition positioned in said chamber intermediate its ends to form a freezing compartment adjacent the inlet end of the chamber and a finishing compartment adjacent the outlet; means in each of said compartments for agitating the ice cream; and a series of inclined spaced-apart blades carried by said partition adapted to force the ice cream from the freezing compartment to the finishing compartment.

4. An ice cream freezer comprising a horizontally disposed cylindrical chamber having an inlet at one end and an outlet adjacent the upper portion of the opposite end thereof; an outlet gate adjustable to vary the vertical position of said outlet; a gate controlled outlet positioned adjacent the lower side of said chamber in said opposite end of the chamber, both of said outlets being positioned to deliver into a common conduit mounted on the opposite end; means operable within said chamber to agitate the material being frozen.

5. A freezer comprising a horizontally disposed elongated freezer chamber having an inlet at one end and an outlet at its opposite end; a refrigerant jacket surrounding said chamber; a rotatably mounted partition positioned in said chamber to form a freezing compartment and a finishing compartment; and means carried adjacent the periphery of said partition and substantially confined to that portion of the chamber occupied by the partition to force the material being frozen from one compartment to the other as the partition is rotated; and means to agitate the material being frozen.

6. A freezer comprising an elongated, horizontally disposed, cylindrical freezer chamber having an inlet at one end and an outlet at its opposite end; a refrigerant jacket surrounding said chamber; a scraper extending substantially the full length of said chamber and mounted for rotation therein; a partition carried by said scraper intermediate its ends adapted to divide said chamber into two compartments; an agitator mounted in one of said compartments; a dasher mounted in the other of said compartments; and means to drive said scraper, agitator and dasher.

7. A freezer comprising an elongated, horizontally disposed, cylindrical freezer chamber having an inlet at one end and an outlet at its opposite end; a refrigerant jacket surrounding said chamber; a scraper extending substantially the full length of said chamber and mounted for rotation therein; a partition carried by said scraper intermediate its ends adapted to divide said chamber into two compartments; an agitator mounted in one of said compartments; a dasher mounted in the other of said compartments; and driving means operable to rotate the scraper in one direction and dasher and agitator in the opposite direction, said driving means being operable to vary at will the relative rate of rotation of the dasher and agitator.

8. A freezer comprising a horizontally disposed cylindrical chamber having an inlet and an outlet, a refrigerant jacket surrounding said chamber; a scraper mounted for rotation in said chamber having two sets of spaced-apart, longitudinally disposed blades with a hingedly mounted scraper blade mounted therebetween; a dasher rotatably mounted in said chamber and circumscribed by the path of travel of said scraper; and common means for driving said scraper and dasher at relatively different speeds.

WILLIAM H. PAYNE.
FRANCIS R. PROPER.